United States Patent Office 3,549,407
Patented Dec. 22, 1970

3,549,407
PROCESS FOR APPLYING A TEXTURED DECORATIVE COATING TO A METAL SUBSTRATE AND ARTICLE THEREOF
James Howard Williamson, Flint, Mich., assignor to E. I. du Pont de Nemours and Company, Wilmington, Del., a corporation of Delaware
No Drawing. Filed Feb. 29, 1968, Ser. No. 709,220
Int. Cl. B44d 1/16; B32b 15/08
U.S. Cl. 117—45         6 Claims

ABSTRACT OF THE DISCLOSURE

A coating composition for metal substrates which comprises a base composition which is a blend of a urethane polymer and a vinyl chloride polymer that is applied to a metal substrate and a webbing composition which is a methacrylate polymer that is applied as a decorative textured pattern over the base composition.

BACKGROUND OF THE INVENTION

This invention relates to a decorative coating composition and in particular to the decorative coating composition of a urethane polymer base composition over which is applied a decorative textured webbing composition of a methacrylate polymer.

In the auto industry, there has been a great need for a tough, durable but decorative coating composition that would visually obscure metal defects, joints, nuts, bolts, welds and clips, particularly in the interior trunk area of the automobile. Cellular polyurethane structures have been successfully used as trunk coatings but the cost of these coatings is high, since a relatively thick coating is required to give a cellular layer. The novel coating composition of this invention gives a decorative but tough, durable coating which is particularly suited for automotive trunks but is also useful for a variety of other purposes, such as on boats, airplanes and the like.

STATEMENT OF THE INVENTION

A coating composition for substrates which comprises a base composition which is applied to the substrate and a webbing composition which is applied over the base composition as a decorative web which is firmly adhered to the base composition after being dried. The base composition has a film-forming polymer solids content of about 5–65%, a viscosity at 25° C. of about 100–5,000 centipoises and the polymer is dissolved in a volatile organic solvent. The film-forming polymer of the base composition consists essentially of:

(a) About 10–50% by weight, based on the weight of the film-forming polymer, of a vinyl chloride polymer; and (b) About 90–50% by weight, based on the weight of the film-forming polymer, of a thermosetting isocyanate terminated polyurethane having a weight average molecular weight of about 1,000–10,000 which is the reaction product of an organic diisocyanate and a polymeric material having active hydrogen groups that is either a polyalkyleneether glycol or a hydroxyl terminated polyester.

The webbing composition is a solution of about 50–90% by weight of a methacrylate polymer having a weight average molecular weight of about 40,000–120,000 and a volatile organic solvent for the methacrylate polymer.

DESCRIPTION OF THE INVENTION

Preferably, the novel coating composition of this invention is applied to a suitably primed metal substrate and has a base composition which consists essentially of about 25–45% by weight based on the weight of the film-forming polymer, of a vinyl chloride polymer and about 75–55% by weight of a polyester urethane having a weight average molecular weight of about 1,500–5,000, and has a webbing composition of a methyl methacrylate polymer.

The base composition has a polymer solids content of about 5–65% by weight, preferably about 20–40% by weight and a viscosity measured at 25° C. of about 100–5,000 centipoises, and preferably about 300 to 800 centipoises.

The "vinyl chloride polymers" used in the base composition of this invention contains vinyl chloride as the main constituent but, preferably, contains up to 25% by weight of other copolymerizable monomers, such as vinyl alcohol, vinyl acetate, vinylidene chloride, acrylonitrile, esters of maleic acid, esters of fumaric acid, acrylic esters, ethylene and the like. One preferred vinyl chloride polymer contains about 80 to 95% by weight vinyl chloride and 5 to 20% by weight vinyl acetate.

The urethane polymer used in the base composition of this invention is a thermosetting isocyanate terminated polyurethane which is the reaction product of an organic diisocyanate and an active hydrogen containing polymeric material, such as a polyalkyleneether glycol or a hydroxyl terminated polyester.

The polyurethane polymer useful in this invention is prepared by first mixing a molar excess of the diisocyanate with the active hydrogen containing polymeric material and heating the mixture at about 50–120° C. until the polymer is formed. Or, the diisocyanate can be reacted with a molar excess of the active hydrogen containing polymeric material, and the reaction product capped by reacting it with more diisocyanate to form the polymer. Preferably, the resulting polyurethane has a weight average molecular weight of about 1,000–10,000 and more preferably, 1,500–5,000.

Aromatic, aliphatic and cycloaliphatic diisocyanates or mixtures thereof can be used in forming the polymer. Such diisocyanates are, for example, tolylene-2,4-diisocyanate, tolylene-2,6-diisocyanate, m-phenylene diisocyanate, biphenylene-4,4'-diisocyanate, methylene bis(4-phenyl isocyanate), 4-chloro-1,3-phenylene diisocyanate, naphthalene-1,5-diisocyanate, tetramethylene-1,4-diisocyanate, hexamethylene-1,6-diisocyanate, decamethylene-1,10-diisocyanate, cyclohexylene-1,4-diisocyanate, methylene bis(4-cyclohexyl isocyanate) and tetrahydronaphthalene diisocyanate.

A polyalkyleneether glycol can be used as the hydrogen containing polymeric material for forming the polyurethane polymer used in this invention. The most useful polyglycols have a molecular weight of 300 to 5,000, preferably 400 to 2,000, and include, for example, polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyglycols containing several different radicals in the molecular chain, such as, for example, the compound

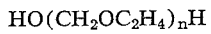

$$HO(CH_2OC_2H_4)_nH$$

wherein $n$ is an integer greater than 1 can also be used.

Polyesters which can be used instead of, or in conjunction with, the polyalkyleneether glycols are, for example, those formed by reacting acids, esters or acid halides with glycols. Suitable glycols are polymethylene glycols, such as ethylene-, propylene-, tetramethylene-, decamethylene glycol, substituted polymethylene glycols, such as 2,2-dimethyl-1,3-propanediol, cyclic glycols, such as cyclohexanediol and aromatic glycols, such as xylylene glycol. Aliphatic glycols are generally preferred when a tough coating composition is desired. These glycols are reacted with aliphatic, cycloaliphatic or aromatic dicarboxylic acids or lower alkyl esters or ester forming derivatives thereof to produce relatively low molecular weight polymers having molecular weights like those indicated for the polyalkyleneether glycols. Acids for preparing such polyesters are, for example, succinic, adipic, suberic, sebacic, terephthalic and hexahydroterephthalic acids and the alkyl and halogen substituted derivatives of these acids.

One highly preferred polyester urethane, since it gives a high quality product, is the reaction product of a hydroxyl terminated polyester of adipic acid, propylene glycol and ethylene glycol and toluene diisocyanate.

Often it is desirable to add isocyanate block agents to the base composition to prevent premature cross-linking of the composition. Conventional blocking agents, such as ketoximes, for example, methyl ethyl ketoxime, phenols, lactams, imides, aryl mercaptans, diethyl malonate, acetyl acetone and the like can be added. The amount of block agent that is added is dependent upon the isocyanate content of the composition. Generally, the blocking agent should be present in at least the same molar concentration as the unreacted isocyanate or in a 10–20% molar excess.

Preferably, curing agents are added to the polyurethane composition to form a thermosetting composition which cross-links after it has been applied. Preferably, these curing agents have free hydroxyl radicals and can be, for example, N,N,N',N'-tetrakis(2 - hydroxypropyl)ethylene diamine, triisopropanolamine, triethanolamine and the like. The amount of curing agent is ordinarily 10–100% of the molar concentration of isocyanate which for most —NCO terminated polyurethanes is about 1–20% by weight of the polyurethane.

Superior films can be obtained if the base composition contains a plasticizer for the urethane polymer. Sucrose diacetate hexaisobutyrate is one highly preferred plasticizer. Other plasticizers, such as phthalate esters, as butyl benzyl phthalate and tricresyl phosphate can be used. These plasticizers are generally used at levels of about 1–35% by weight based on the weight of the urethane polymer and preferably at 10–20% by weight of the polymer.

The base composition can be a clear film but for most uses, such as a finish for the interior of auto trunks, it is preferred that the base composition be pigmented. The composition is pigmented in the amount of about 0.1–20.0% pigment volume concentration but preferably a pigment volume concentration of about 0.3–6.0% is used. The following are examples of the great variety of pigments which are used in the base composition of this invention: metallic oxides, preferably titanium dioxide, zinc oxide, and the like, metal hydroxides, metal flakes, chromates, such as lead chromate; sulfides, sulfates, carbonates, carbon black, silica, talc, china clay, organic dyes, lead, iron blues, organic reds, maroon and other organic dyes and lakes.

The base composition is preferably a solution but may be a dispersion of the urethane polymer and the vinyl chloride polymer. The following are examples of solvents and diluents which are used to form the base composition: toluene, xylene, butyl acetate, methyl isobutyl ketone, methylethyl ketone, butyl alcohol, dioxane, dimethyl formamide, tetrahydrofuran and a mixture of acetone and toluene. Acetone/toluene mixtures are preferred since this solvent mixture gives a high quality film.

The base composition of the invention can be applied to a variety of substrates, such as wood, glass, metal, by any of the usual application methods, such as spraying, dipping, brushing, flow-coating, electrocoating and the like. Preferably, a suitably primed ferrous substrate is used. The primer preferably is an alkyd resin pigmented, for example, with carbon black or iron oxide. About a 1 to 5 mil thick wet coat of the base composition is applied. Preferably, while the base composition is still wet with solvent, the webbing composition is sprayed onto the coat of base composition. The webbing composition is sprayed in such a manner as to give a textured decorative effect to the coating. One skilled in the art can readily determine the required spraying technique.

The webbing composition used in this invention to form the textured decorative pattern has a methacrylate polymer solids content of about 50–90% by weight, preferably a solids content of about 55–65% by weight. The methacrylate polymer preferably has a weight average molecular weight of about 60,000–80,000 and a viscosity at 25° C. of about 50–150 centipoises.

The "methacrylate polymer" for the webbing composition of this invention contains methyl methacrylate as the main constituent or preferably has polymerized with the methyl methacrylate up to 50% by weight of other copolymerizable monomers, preferably lower alkyl esters of acrylic acid or methacrylic acid in which the alkyl group contains from about 1–8 carbon atoms. Typical examples of the copolymerizable acrylate esters and methacrylate esters are ethyl acrylate, propyl acrylate, butyl acrylate, 2-ethylhexyl acrylate and the like; ethyl methacrylate, propyl methacrylate, butyl methacrylate, hexyl methacrylate, N,N-diethylaminoethyl methacrylate, 3-methacryloxyethyl-2-spiro - cyclohexyl oxazolidine, 3-hydroxyethyl-2-spiro-cyclohexyl oxazolidine and the like. Other copolymerizable monomers which can be used are acrylonitrile, styrene and vinyl acetate.

The methacrylate polymer can have pendent carboxyl constituents which are provided by α,β-unsaturated carboxylic acid monomers which are copolymerized with the aforementioned methacrylate monomers. These methacrylate polymers can contain about 0.1–3% by weight, and preferably, 0.2–1% by weight, based on the weight of the polymer, of polymerized α,β-unsaturated carboxylic acid units. Typically useful α,β-unsaturated carboxylic acid monomers are methacrylic acid, acrylic acid, itaconic acid, ethylacrylic acid, propylacrylic acid, isopropylacrylic acid and homologues of these acids. Preferred are methacrylic acid and acrylic acid.

Also, the methacrylic polymers used for the webbing composition may contain pendent hydroxyl groups which are obtained by copolymerizing hydroxy alkyl acrylate or a hydroxyl alkyl methacrylate with the methacrylate monomers. About 2–20% by weight of the methacrylate polymer, and preferably, about 5–15% by weight of the methacrylate polymer, of hydroxyalkyl acrylate or methacrylate can be used to form the methacrylate polymer used as the webbing composition in this invention. Typically useful hydroxyalkyl acrylates and methacrylates contain about 1–8 carbon atoms in the alkyl group and are, for example, hydroxyethyl acrylate, hydroxypropyl acrylate, hydroxybutyl acrylate, hydroxyoctyl acrylate, and the like, hydroxymethyl methacrylate, hydroxyethyl methacrylate, hydroxypropyl methacrylate, hydroxybutyl methacrylate, hydroxyhexyl methacrylate, hydroxyoctyl methacrylate, and the like.

Also, about 15–75% by weight, and preferably, about 20–40% by weight, based on the weight of the film-forming material of the coating composition, of cellulose acetate butyrate can be used with the aforementioned methacrylate polymer to form the webbing compositions that can be used in this invention. Preferably, the cellulose acetate butyrate used has a viscosity at 25° C. of about 0.1–20.0 seconds and more preferably a viscosity of 2–5 seconds determined according to the method of ASTM D–1343–56.

The webbing composition of the methacrylate polymer can be plasticized with any of the aforementioned plasticizer used on the base coat. The webbing composition can be clear but preferably, is pigmented to give a decorative effect. Any of the aforementioned pigments in the above pigment volume concentration can be used.

After the methacrylate polymer webbing composition is sprayed onto the base coat, the coated substrate can be air dried, but preferably, is baked at 100–200° C. for about 5–60 minutes and, more preferably, at 115–130° C. for about 20–40 minutes. The coating can also be air dried but baking is preferred.

The following example illustrates the invention. The parts and percentages are by weight unless otherwise specified.

EXAMPLE 1

The following ingredients are blended together to form the base composition.

| Portion 1: | Parts by weight |
| --- | --- |
| Toluene | 15.9 |
| Acetone | 7.9 |
| Copolymer of vinyl chloride/vinyl acetate (weight ratio 91/9) | 7.9 |
| Portion 2: Acetone | 7.9 |
| Portion 3: Diatomaceous earth | 2.5 |
| Portion 4: "Unithane" 200 (70% polymer solids in toluene, polymer believed to be an isocyanate terminated polyurethane having a weight average molecular weight of about 1,000–5,000 and is the reaction product of a hydroxyl terminated polyester of adipic acid, propylene glycol, ethylene glycol that is reacted with toluene diisocyanate and a small portion of a curing agent of N,N,N′,N′-tetrakis(2 - hydroxypropyl)ethylene diamine) | 21.5 |
| Portion 5: Sucrose di-acetate hexaisobutyrate | 4.1 |
| Portion 6: Zinc-chromate solution (50% zinc chromate solids in a vinyl polymer solution which is of the same composition as Portion 1 above) | 6.0 |
| Portion 7: Carbon black dispersion (73% by weight carbon black, 38.2% by weight polymethyl methacrylate, 54.5 parts by weight xylene) | 14.7 |
| Portion 8: White pigment dispersion (58.0% by weight titanium dioxide, 14.3% by weight polymethyl methacrylate, 12.0% by weight acetone 12.0% by weight Cellosolve acetate) | 11.6 |
| Total | 100.0 |

The ingredients of Portion 1 are thoroughly mixed for one hour. Portions 2, 3 and 4 are added separately to Portion 1 and thoroughly mixed. After Portion 4 is added, the resulting mixture is blended for 1 hour. Portions 5, 6, 7 and 8 are added separately to the mixture and each is thoroughly blended.

The resulting base composition has the following characteristics: weight per gallon 8.6 pounds; weight solids 43.6%; volume solids 30.1%; pigment volume concentration 10.59; total binder 30.2% and a viscosity of 550 centipoises measured at 25° C.

A webbing composition is prepared by blending the following ingredients:

| | Parts by weight |
| --- | --- |
| Sucrose diacetate hexaisobutyrate | 6.9 |
| Polymethyl methacrylate—weight average molecular weight 60,000–80,000 | 57.3 |
| White pigment dispersion (same as in base composition) | 3.8 |
| Carbon black dispersion (same as in base composition) | 0.8 |
| Toluene | 31.2 |
| Total | 100.0 |

The resulting webbing composition has the following physical charactrisitcs: weight per gallon 7.9 pounds; weight solids 32.0%; volume solids 23.7%; pigment volume concentration 2.3; and total binder 29.7% and a viscosity of 100 centipoises measured at 25° C.

The base composition is reduced to a spraying viscosity by diluting the base composition with equal parts of a solvent mixture of acetone/toluene which are in a 1:1 ratio. The base composition is sprayed with an air gun onto a steel substrate primed with a pigmented alkyd resin to a wet film thickness of about 3 mils which will dry to about a 1 mil thick coat. While the base composition is still wet, the webbing composition is sprayed with an air gun onto the base composition in such a manner as to give a patterned, textured styling effect. The coating is then baked for 30 minutes at about 122° C. The coating has a soft rubbery touch and exhibits excellent corrosion resistance when subjected to a standard corrosion test for 1 week. A control panel coated with a conventional alkyd coating composition exposed under the same conditions was badly pitted and rusted after the same time of exposure. The resulting webbing coat is not a continuous coat but gives a textured patterned effect, which makes the resulting two-layered coating extremely desirable for trunks of automobiles.

I claim:
1. A process for applying a coating to metal substrate which comprises:
  (1) applying a base composition to a primed ferrous metal substrate to a wet film thickness of about 1–5 mils;
    wherein said base composition has a viscosity of about 100–5,000 centipoises at 25° C., and contains a film forming polymer having a polymer solids content of 5–65%, the polymer is dissolved in a volatile organic solvent and consists essentially of:
      (a) about 10–50% by weight, based on the weight of the film-forming polymer, of a vinyl chloride polymer which contains up to 25% by weight of other copolymerizable monomers; and
      (b) about 90–50% by weight, based on the weight of the film-forming polymer, of a thermosetting isocyanate terminated polyurethane having a weight average molecular weight of about 1,000–10,000, which is the reaction product of an organic diisocyanate and a polymeric material having active hydrogen groups selected from the group consisting of polyalkyleneether glycol and a hydroxyl terminated polyester;
  (2) spraying the base composition with a webbing composition to form a random textured decorative pattern while said base composition is still wet with solvent;
    wherein said webbing composition comprises a solution of 50–90% by weight of a polymer and 50–10% by weight of a solvent for the polymer in which the polymer consists essentially of polymethyl methacrylate having a viscosity of about 50 to 150 centipoises measured at 25° C.;
  (3) drying the resulting coated metal substrate by baking the coated substrate at about 100–200° C. for about 5–60 minutes.

2. The process of claim 1 in which the polyurethane of the base composition is an isocyanate terminated polyesterurethane, and the webbing composition consists essentially of polymethyl methacrylate having a weight average molecular weight of about 60,000–80,000.

3. The process of claim 1 in which the base composition consists essentially of:
  (a) about 24–45% by weight of the film-forming polymer of a copolymer of 80–95% by weight vinyl chloride and 5–20% by weight vinyl acetate; and
  (b) about 75–55% by weight of a polyesterurethane having a weight average molecular weight of about 1,500–5,000, said polyesterurethane being the polymerization product of adipic acid, propylene glycol and ethylene glycol, and contains about 1–20% by weight based on the weight of said polyesterurethane of N,N,N',N'-tetrakis-(2-hydroxypropyl)ethylene diamine; and in which the webbing composition consists essentially of polymethyl methacrylate having a weight average molecular weight of about 60,000–80,000.

4. The process of claim 3 in which the base composition contains additionally 1–35% by weight, based on the weight of the film-forming polymer, of sucrose diacetate hexaisobutyrate.

5. A coated metal article made by the process of claim 1.

6. The article of claim 5 in which the metal substrate is a ferrous metal substrate primed with a dried and coalesced pigmented alkyd resin.

References Cited

UNITED STATES PATENTS

| | | | |
|---|---|---|---|
| 2,606,162 | 8/1952 | Coffey et al. | 117—161(KP) |
| 2,873,210 | 2/1959 | Barrett et al. | 117—75 |
| 2,891,876 | 6/1959 | Brown et al. | 117—161(KP) |
| 2,934,510 | 4/1960 | Crissey et al. | 117—75X |
| 3,024,216 | 3/1962 | Smitmans et al. | 117—161(KP) |
| 3,149,994 | 9/1964 | Congleton et al. | 117—45 |
| 3,202,527 | 8/1965 | Stevens | 117—45 |

WILLIAM D. MARTIN, Primary Examiner

RALPH HUSACK, Assistant Examiner

U.S. Cl. X.R.

117—72, 73, 74, 75, 84, 104, 132